US008414284B2

(12) United States Patent
Vargo

(10) Patent No.: US 8,414,284 B2
(45) Date of Patent: Apr. 9, 2013

(54) EXTRUDER AND ROLLER-DIE COMBINATION

(75) Inventor: Richard David Vargo, Cuyahoga Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 171 days.

(21) Appl. No.: 12/984,157

(22) Filed: Jan. 4, 2011

(65) Prior Publication Data
US 2012/0171320 A1    Jul. 5, 2012

(51) Int. Cl.
*B29C 43/24* (2006.01)
(52) U.S. Cl. ............... 425/367; 425/381; 425/379.1; 425/466; 425/374; 264/175
(58) Field of Classification Search .......... 425/466, 425/374, 379.1–381; 264/175, 176.1
See application file for complete search history.

(56) References Cited

U.S. PATENT DOCUMENTS

| | | | | |
|---|---|---|---|---|
| 2,657,431 | A | * | 11/1953 | Slaughter ............... 264/542 |
| 3,085,292 | A | * | 4/1963 | Kindseth ............... 264/167 |
| 3,142,091 | A | | 7/1964 | Curtiss ............... 47/32 |
| 3,609,810 | A | * | 10/1971 | Coghill ............... 425/113 |
| 3,871,810 | A | | 3/1975 | Geyer ............... 425/374 |
| 4,299,789 | A | | 11/1981 | Giesbrecht ............... 264/176 R |
| 4,439,125 | A | | 3/1984 | Dieckmann et al. ............... 425/140 |
| 4,683,095 | A | | 7/1987 | Tolonen et al. ............... 264/171 |
| 4,744,745 | A | | 5/1988 | Harada et al. ............... 425/466 |
| 4,828,770 | A | | 5/1989 | Fabian et al. ............... 264/40.3 |
| 5,030,079 | A | | 7/1991 | Benzing, II ............... 425/140 |
| 5,094,792 | A | | 3/1992 | Baran ............... 264/171 |
| 5,116,211 | A | * | 5/1992 | Shinmoto ............... 425/141 |
| 5,122,049 | A | * | 6/1992 | Baumgarten ............... 425/188 |
| 5,919,493 | A | * | 7/1999 | Sheppard et al. ............... 425/174.2 |
| 6,155,814 | A | * | 12/2000 | Hayashi ............... 425/363 |
| 6,478,564 | B1 | | 11/2002 | Tieu et al. ............... 425/145 |
| 6,491,510 | B1 | | 12/2002 | Tieu et al. ............... 425/145 |
| 6,716,021 | B2 | | 4/2004 | Worley et al. ............... 425/379.1 |
| 6,994,536 | B2 | | 2/2006 | Worley et al. ............... 425/113 |
| 7,205,017 | B2 | * | 4/2007 | Hayashi et al. ............... 426/502 |
| 2005/0087905 | A1 | * | 4/2005 | Looman et al. ............... 264/177.1 |
| 2006/0230631 | A1 | | 10/2006 | Flanery ............... 34/418 |
| 2009/0206503 | A1 | * | 8/2009 | Han et al. ............... 264/75 |

FOREIGN PATENT DOCUMENTS

| | | |
|---|---|---|
| CH | 401453 | 10/1965 |
| EP | 0410852 | 1/1991 |
| GB | 2249518 | 5/1992 |

OTHER PUBLICATIONS

RMS Equipment Company, Data sheet, Rubber Extrusion, Single Roll Roller Die, published as early as Jul. 10, 2008.
European Search Report completed May 7, 2012.

* cited by examiner

*Primary Examiner* — Joseph S Del Sole
*Assistant Examiner* — Nahida Sultana
(74) *Attorney, Agent, or Firm* — Robert N. Lipcsik

(57) ABSTRACT

An apparatus forms an elastomeric strip. The apparatus includes a roller and an adjustable surface. The roller has a cylindrical surface. The roller rotates at a predetermined angular velocity. The adjustable surface confronts the cylindrical surface and has a first stationary position relative to the cylindrical surface such that the apparatus forms an elastomeric strip having a first thickness. The adjustable surface is adjustably pivotable relative to the cylindrical surface such that the adjustable surface moves to a second stationary position for forming an elastomeric strip having a second thickness.

8 Claims, 3 Drawing Sheets

EXTRUDER AND ROLLER-DIE COMBINATION

FIELD OF INVENTION

The present invention relates to an apparatus for forming an elastomeric strip, and more particularly, to an apparatus for adjusting the parameters of the elastomeric strip.

BACKGROUND OF THE INVENTION

A conventional apparatus for forming a continuous elastomeric strip, such as in the nature of a tire tread slab may utilize an assembly constituted primarily of a driven roller and a stationary die-blade confronting the roller and defining therewith a convergent nozzlelike chamber. The chamber operates on an elastomeric mass to convert the latter into a continuous elastomeric strip having thin, longitudinally extending edges.

Conventional practices for shaping or otherwise fabricating elastomeric strips, in the form of tread slabs of rubber composition, for use in manufacturing pneumatic tires, have proven to be less than most desirable, this because the tread slab, at least in certain instances, is not reliably formed with coherent edges in which the integrity thereof is sharply maintained. Edges, as conventionally understood, are those opposed, longitudinal, elongate edges of the tread slab which are of extremely thin nature, and present a smooth transition between the sidewall and tread portions of a pneumatic tire carcass to permit high quality stitching (adhesion) of the tread slab to the tire carcass.

A tread slab, at least pursuant to one conventional apparatus, may be extruded under pressure through a slit-die, the latter being contoured to appropriately impart to the elastomeric material, of which the tread slab is constituted, a preferred cross-sectional contour. The disadvantage associated with the conventional slit-die assembly is that the pressure exerted against the elastomeric material, as the latter issues through the slit-die, is a limited function of the pressure developed by the extrusion assembly upstream of the slit-die. As a result, therefore, since the conventional extrusion apparatus, upstream of the slit-die, has a limited maximum capacity for developing pressure therein especially so as not to overplasticize the elastomeric mass, the apparatus cannot reliably impart to the elastomeric material the more preferable, coherent and generally blemish-free edges.

In order to overcome the disadvantages associated with the conventional slit-die assembly, the slit-die, downstream of the extrusion unit, has been replaced by, or otherwise substituted for, a calendering assembly in which there are provided a pair of opposing rolls or rollers, one of which is contoured and cooperates with an uncontoured, substantially cylindrical surface of the opposing roller, or mate thereof, for purposes of imparting to the elastomeric mass, as the latter is extruded to and through the nip area or clearance therebetween, a preferred cross-sectional appearance.

The calender rolls, downstream of the extruder in an additive or supplemental manner, provide means for increasing the pressure to which the elastomeric mass is subjected as it is extruded through the nip area between the rollers. The pressure is increased from that pressure developed by the extrusion apparatus, to an added or supplemental pressure generated by the rollers as the latter are drivingly rotated in the direction of feed or extrusion of the elastomeric mass. Thus, the utilization of calender rolls downstream of a conventional extrusion apparatus is somewhat more beneficial than merely utilizing a conventional slit-die assembly because the calender rolls themselves, when driven, introduce increased energy into the elastomeric mass as the latter passes through the nip area therebetween.

However, calendering rolls provide only a minimum effective surface area against which the elastomeric mass engages, the effective or working surface area being respective segments of the opposing rolls of minimal arcuate extent, which converge toward and thereafter diverge away from one another specifically at the nip area between the rolls. Thus, although calender rolls permit the increasing of nip pressures such as by decreasing the clearance between the rolls, or by increasing the rate of rotation of the rolls, since the elastomeric mass is only subjected to the increased pressure over minimal arcuate working surface segments of the opposing rolls, the ultimate cross-sectional contour of the elastomeric product issuing from the nip will not necessarily and predictably have blemish-free, highly coherent edges to the extent that may be desirable without replacing/recutting the roll.

Another disadvantage associated with the utilization of calendering rolls, one which is of substantially cylindrical extent, or uncontoured, and the other contoured circumferentially to cooperate with the uncontoured roll, is that the contoured roll cannot be most effectively fabricated with a sharp profile, or effectively scraped and cleaned when necessary to present a sharp profile. Thus, the ultimate shape of the elastomeric product is often undesirably dependent upon the lack of a sharp profile in the contoured roll due to fabrication deficiencies or excess elastomeric stock caked upon, and not fully removed from, the contoured roll. Moreover, the contoured roll is of considerable bulk and does not readily lend itself to be easily exchanged for another when necessary for altering the cross-sectional appearance of the elastomeric product.

Thus, despite the provision of calendering rolls downstream of an extrusion assembly for enhancing the degree of pressure to which the elastomeric mass is to be subjected, this being a significant improvement over the conventional slit-die assembly, there still remains serious disadvantages associated with the use of conventional calendering rolls in conjunction with a conventional extrusion apparatus.

Consequently, it had been desirable to provide an improved extrusion die-calendering apparatus in which not only can the pressure, to which the elastomeric mass is subjected, be significantly increased, but the duration, or preservation, of time in which the elastomeric mass is subjected to the increased pressure will be likewise significantly increased to permit the formation or shaping of an elastomeric product, in the nature of a tread slab for pneumatic tires, which will present coherent edges of high integrity. The conventional improved assembly comprises only one roll while the second contoured roll being replaced by a less bulky, readily changeable, stationary, contoured die-blade which can be more accurately fabricated with a sharp profile than can the contoured roll.

It had also been desirable to reduce the extent of swelling normally attributable to an elastomeric product after the product has been discharged from an extrusion-shaping assembly. In this respect, the development of internal stresses within the elastomeric product, during formation thereof, comes about partly from extruder speed and/or roll speed. Further, the extrusion speed of the extrusion die-calendering apparatus may be varied (increased) without affecting the integrity or coherency of the ultimate edges formed on the product, but may affect the profile and shrinkage characteristics of the elastomeric product. Additionally, secondary dies may be utilized upstream of the main die such as for purposes of adjusting or controlling the quantity of elastomeric mass fed to the main die.

The conventional assembly may comprise a driven roller, a stationary die-blade, which confronts and converges toward an arcuate segment of the roller, the die-blade and roller cooperatively defining a pressure chamber therebetween terminating in a narrow restriction orifice, and means such as an extruder for introducing the elastomeric mass under pressure into the chamber and upon the roller. The chamber may gradually reduce the cross-sectional thickness of the elastomeric mass and preform the elastomeric mass, whereas the restriction orifice, under increased pressure, imparts to the elastomeric mass a final cross-sectional construction.

DEFINITIONS

"Apex" means an elastomeric filler located radially above the bead core and between the plies and the turnup ply.

"Annular" means formed like a ring.

"Aspect ratio" means the ratio of its section height to its section width.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25°-65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). Dtex means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Gauge" refers generally to a measurement, and specifically to a thickness measurement.

"High Tensile Steel (HT)" means a carbon steel with a tensile strength of at least 3400 MPa @ 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa @ 0.20 mm filament diameter.

"Normal Load" means the specific design inflation pressure and load assigned by the appropriate standards organization for the service condition for the tire.

"Normal Tensile Steel (NT)" means a carbon steel with a tensile strength of at least 2800 MPa @ 0.20 mm filament diameter.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa @ 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa @ 0.20 mm filament diameter.

"Yarn" is a generic term for a continuous strand of textile fibers or filaments. Yarn occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

SUMMARY OF THE INVENTION

An apparatus for in accordance with the present invention forms an elastomeric strip. The apparatus includes a roller and an adjustable surface. The roller has a cylindrical surface. The roller rotates at a predetermined angular velocity. The adjustable surface confronts the cylindrical surface and has a first stationary position relative to the cylindrical surface such that the apparatus forms an elastomeric strip having a first thickness. The adjustable surface is adjustably pivotable relative to the cylindrical surface such that the adjustable surface moves to a second stationary position for forming an elastomeric strip having a second thickness.

According to another aspect of the present invention, the adjustable surface has a rounded surface opposing the roller.

According to still another aspect of the present invention, the adjustable surface moves to a third stationary position for forming an elastomeric strip having a third thickness.

According to another yet aspect of the present invention, the apparatus includes an extruder assembly for conveying an elastomeric mass to the roller and the adjustable surface.

According to another still aspect of the present invention, the extruder assembly includes an extrusion barrel and an extrusion screw rotating within the extrusion barrel for conveying the elastomeric mass with the extrusion barrel.

According to another yet aspect of the present invention, the elastomeric mass includes one of the materials in the following group: natural rubber; synthetic rubber; a blend of natural and synthetic rubbers; a synthetic elastomeric resin; and combinations of natural rubber and synthetic resins.

According to another still aspect of the present invention, the apparatus includes a transition pressure chamber for receiving the elastomeric mass from the extrusion assembly.

According to another yet aspect of the present invention, the transition pressure chamber widens horizontally and narrows vertically in a direction of flow of the elastomeric mass.

According to another still aspect of the present invention, the transition pressure chamber has an elongate trunk portion downstream of the widening and narrowing transition pressure chamber.

According to another yet aspect of the present invention, the elastomeric strip is a tread slab.

BRIEF DESCRIPTION OF THE DRAWINGS

The above and additional objects and advantages of the present invention may be more clearly understood from the following detailed description of an example thereof when read in conjunction with the accompanying drawings in which.

DETAILED DESCRIPTION OF AN EXAMPLE OF THE PRESENT INVENTION

Figure 1:
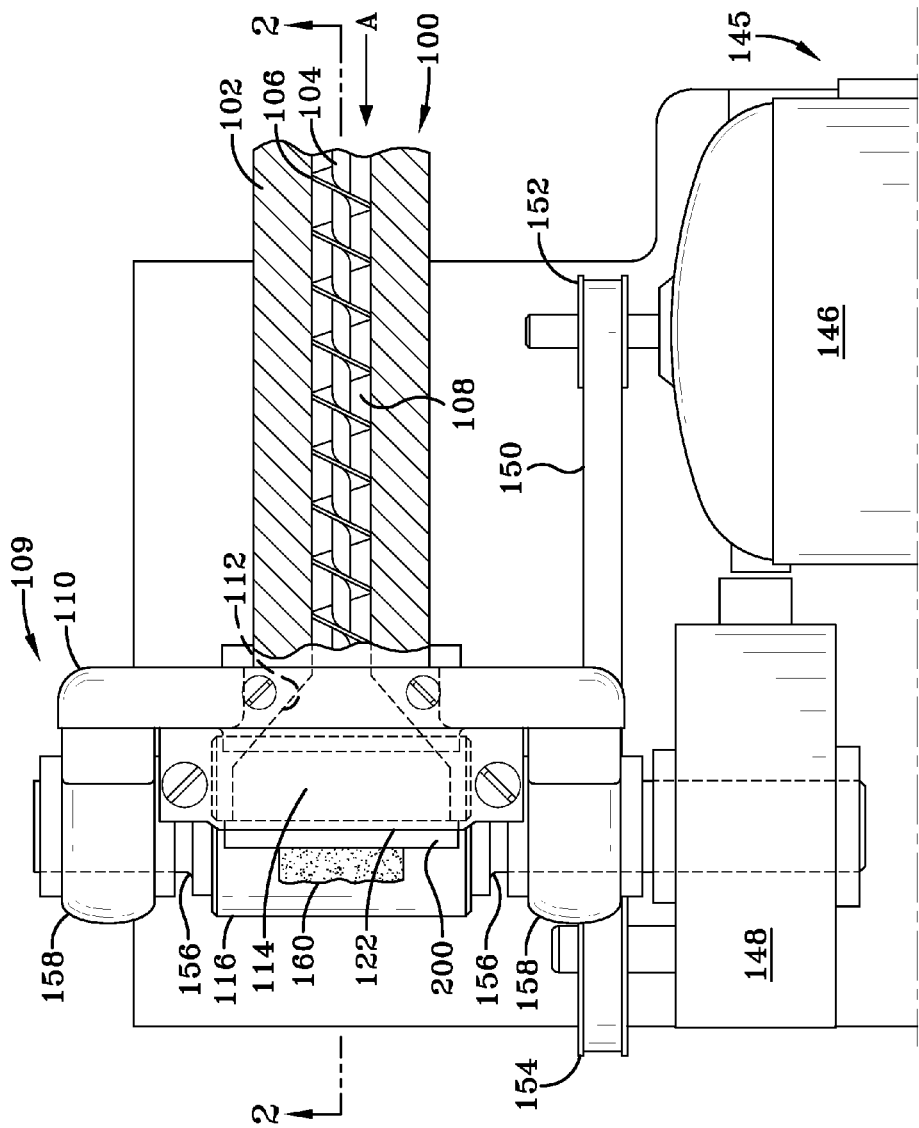
FIG. 1 is a fragmentary, schematic plan view, partly in cross-section, illustrating an example assembly in accordance with the present invention.

FIG. 1 is a fragmentary, schematic plan view, partly in cross-section, illustrating an example assembly in accordance with the present invention. The apparatus may employ an extruder assembly denoted generally by the reference character 100. The extruder assembly 100 may include an extrusion barrel 102 in which is rotatably disposed an extrusion screw 104 having a helical thread flight 106. The extrusion screw 104, upon rotating, may act to extrude and feed an elastomeric mass 108 in the direction of arrow A toward a die-roller calendering unit, shown generally at 109, which includes an extrusion die-head 110. The elastomeric mass 108 may be a natural or synthetic rubber, a blend of natural and synthetic rubbers, a synthetic elastomeric resin, combinations of natural rubber and synthetic resins, or any other suitable composition generally utilized in the manufacture of elastomeric articles such as tread slabs for pneumatic tires.

Figure 2:
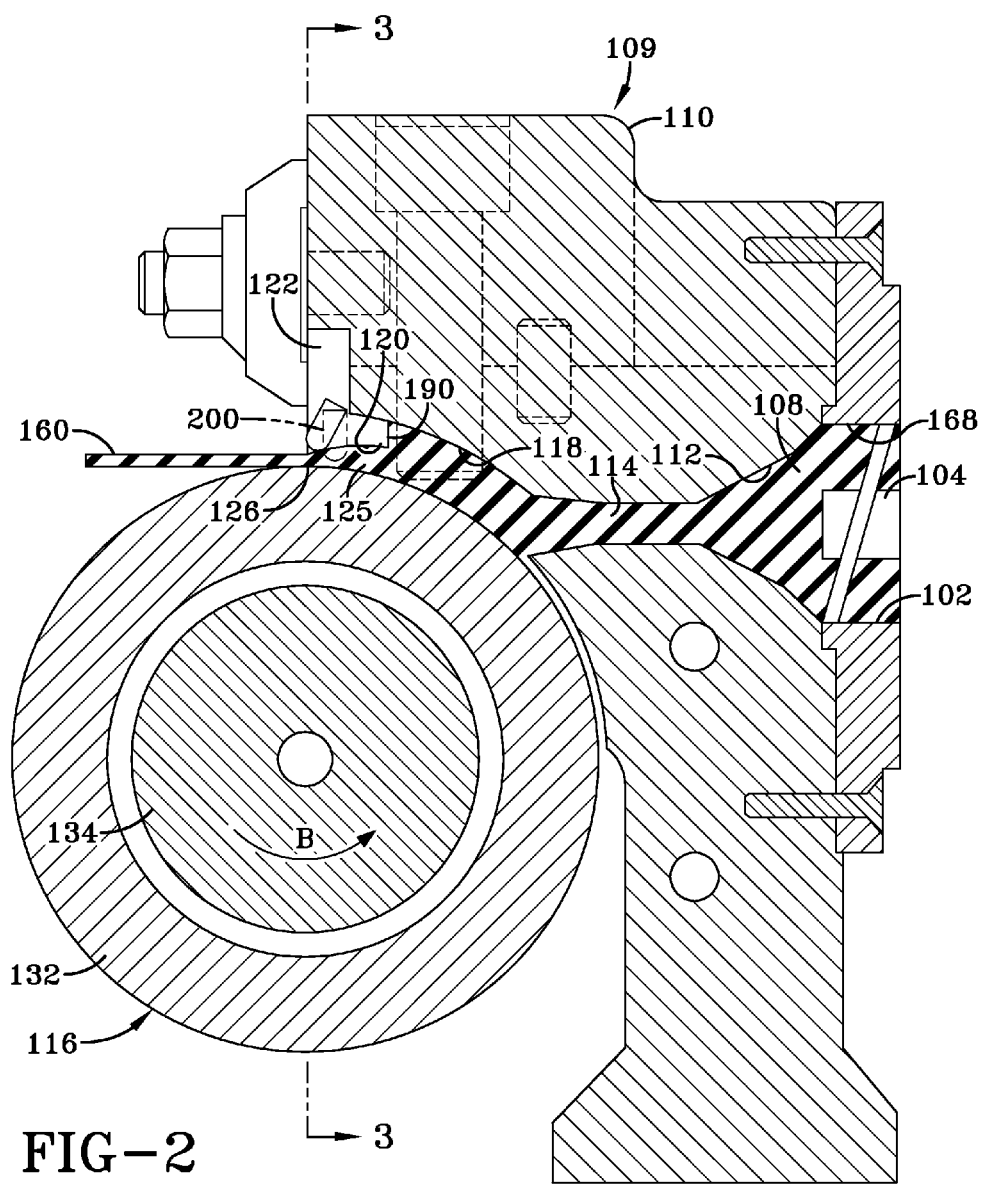
FIG. 2 is a fragmentary, schematic side elevation, cross-sectional view, of the assembly of FIG. 1 taken along line 2-2 in FIG. 1.

The extrusion screw 104 acts to feed the elastomeric mass 108 toward a transition pressure chamber 112 which widens laterally, or in a horizontal plane, as illustrated in FIG. 1, and narrows in a vertical plane, as illustrated in FIG. 2. The transition pressure chamber 112 is provided with an elongate trunk portion 114 which communicates with an arcuate segment of a roller 116. The roller 116 is provided with an uncontoured substantially cylindrical surface, the roller 116 being appropriately supported, as will be clarified below, in proximity to the extrusion die-head 110.

The extrusion die-head 110, immediately downstream of the elongate trunk portion 114 of the transition pressure chamber 112, is provided with a stationary, contoured, arcuate or curvilinear, secondary die segment guide-surface 118 which confronts, and is coextensive with, the roller 116. Immediately downstream of the secondary die segment guide surface 118, there is provided a stationary, contoured arcuate or curvilinear, primary die segment guide-surface 120 which tapers or converges toward the roller 116 and confronts the latter coextensively. The primary die segment guide-surface 120 is formed as part of a vertically adjustable die-blade 122, the die-blade 122 being vertically adjustable by pivoting of the die-blade about a horizontal axis to permit adjustment of the clearance between the roller 116 and the primary die segment guide-surface 120.

Figure 3:
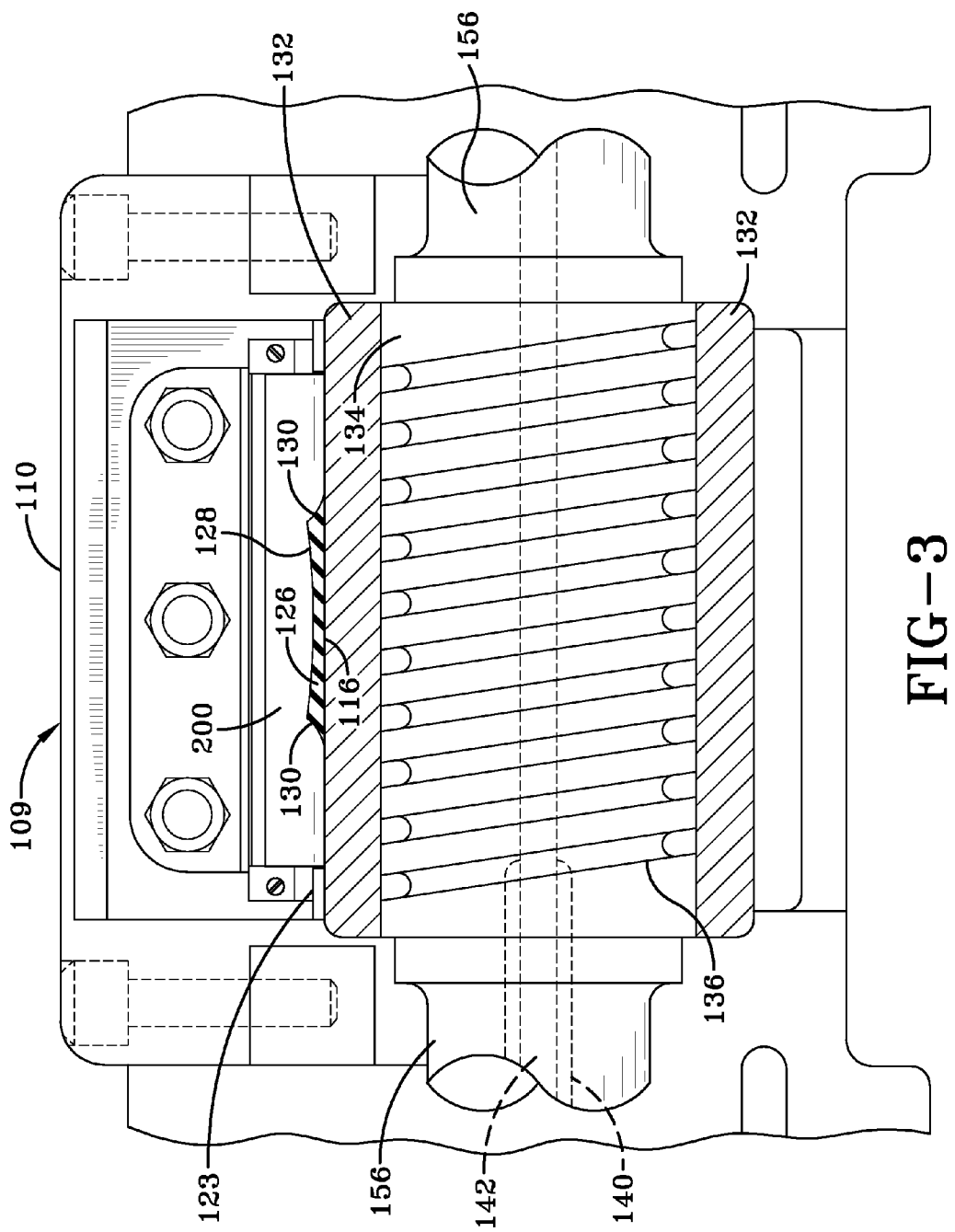
FIG. 3 is a fragmentary, schematic partly cross-sectional, end elevation view of the assembly of FIG. 1 taken along the line 3-3 in FIG. 2.

The die-blade 122 may be provided with a pair of stationary, low-friction, bearing members 123, as illustrated in FIG. 3, which directly engage the roller 116 yet permit generally unrestrained rotation of the latter. The primary die segment guide-surface 120, in cooperation with the arcuate segment of the roller 116, acts to define a nozzle-like, horn, or wedge shaped pressure chamber 125 through which the elastomeric mass 108 passes under progressively increasing pressure, and from which the elastomeric mass 108 emerges in a compressed condition.

As indicated above, and illustrated generally in FIG. 3, the primary die segment guide-surface 120 of the die-blade 122 is contoured and defines cooperatively with the roller 116, a narrow restriction orifice 126, the primary die segment guide-surface 120 being laterally contoured axially of the roller 116 and presenting a contoured medial segment 128 and a pair of contoured side wall segments 130 separated from one another through the intermediary of the medial segment 128.

The roller 116 constitutes an axially uncontoured, remaining portion of the narrow restriction orifice 126, the uncontoured portion being formed as part of the outermost periphery of an outer annular segment 132 of the roller 116. The outer annular segment 132 is fixedly mounted upon, and rotatable with, an inner helically threaded segment 134 of the roller 116. The outer surface of the helically threaded segment 134 and the inner surface of the annular segment 132 cooperate to provide a helically extending coolant channel 136 through which a coolant, such as cooling water, may flow. The coolant may be fed thereto via a radial passageway 138 and an annular coolant feed chamber 140 which surrounds an inner coolant return chamber 142, the return chamber 142 communicating directly with a second, terminal, radial passageway 144 of the coolant channel 136 to provide means through which the coolant may egress from the roller vicinity.

Referring again to FIG. 1, the roller 116 may be rotatably driven in the direction of arrow B (FIG. 2) or in the general direction of feed of the elastomeric mass 108 by drive means shown generally at 145. The drive means 145 may include a variable speed motor 146 which cooperates with a reduction gearing assembly 148 through the intermediary of an endless belt 150 mounted upon both a driver pulley 152 and a driven pulley 154, the driver pulley being mounted upon the motor assembly 146 and driven pulley upon the gearing assembly 148. The roller 116 is provided with an axle unit 156 appropriately journalled in support bearings 158, one end of the axle unit 156 being suitably driven by the reduction gearing assembly 148. The drive means 145 provides for suitable control of the peripheral speed or rotational rate of the roller 116.

The driven roller 116 may cooperate with the die-blade 122 to define both the wedge-shaped pressure chamber 125 and the narrow restriction orifice 126 at which the wedge-shaped pressure chamber 125 terminates. As the elastomeric mass 108 is discharged from the narrow restriction orifice 126, it may be imparted with a cross-sectional appearance in the nature of a strip or tire tread slab 160 having feathered edges which are of extremely narrow extent. The feathered edges may be, for example, of knife-like nature and may have a generally unblemished surface-finish conforming extremely closely to that of the contour of the contoured side wall segments 130 of the die-blade 122.

Conventionally, the die-blade 122 may be readily exchanged for purposes of cleaning and the like and replaced immediately by a substitute die, this because of the rather low bulk nature of the die-blade 122, as compared to the high bulk of a conventional contoured roller, the substitution and cleaning of the die-blade 122 enhancing the degree of control over the quality of the feathered edges of the strip 160 as the latter is discharged from the narrow restriction orifice 126.

The exit end 168 of extrusion barrel 102 may be circular in cross-section. Accordingly, in operation, the helical thread flight 106 of the extrusion screw 104 may cause the elastomeric stock 108 to be discharged from the extrusion barrel 102 in cylindrical form. The extrusion screw 104 and barrel 102 may cooperatively generate a pressure which is imparted to the elastomeric mass 108 as the latter is processed through the barrel 102, out of the exit end 168 of the barrel and into the confines of the transition pressure chamber 112. As discussed above, the transition pressure chamber 112 widens laterally or in a horizontal plane, the elongate trunk portion 114 of the transition pressure chamber 112 likewise widening in a horizontal plane, the transition pressure chamber 112 and elongate trunk portion 114. In this respect, that portion of the transition pressure chamber 112 which narrows in a vertical plane, as illustrated in FIG. 2, is provided with a successively changing contour, by which the elastomeric mass 108 is converted from a generally cylindrical or circular appearance to that of a generally twin-paddled appearance.

Thereafter, the elongate trunk portion 114 of the transition pressure chamber 112 commences. Trunk portion 114 changes and increases in lateral expansion through the intermediary of a gradual change in contour. For example, the elastomeric mass 108 may be converted from the generally twin-paddled appearance to that of an increasingly elongated dumb-bell shape configuration. The elastomeric mass 108 may be ultimately formed into a flat slab and thereafter fed onto the roller 116. Thus, the elastomeric mass 108 is converted from the cylindrical or circular cross-sectional configuration, immediately downstream of the extrusion barrel 102, to a low, wide cross-sectional configuration at the end of the elongate trunk portion 114 and is thereafter fed onto the driven roller 116.

The secondary die segment guide-surface 118 (FIG. 2) may be arcuate in nature, generally circumferentially of the roller 116 and may be laterally contoured. The secondary die segment guide-surface 118 may be so contoured to provide a low intermediate portion and higher end portions, respectively. The intermediate portion may be closer to the roller 116 than the end portions and may cause the elastomeric mass 108 to be squeezed vertically at the intermediate portion and laterally outwardly to the end portions. This may allow the elastomeric mass 108 to be uniformly distributed into the confines of the wedging pressure chamber 125 defined by the primary die segment guide-surface 120 and the peripheral surface of the roller 116.

The roller 116, as it is rotatably driven by the drive means 145, may act to impart energy in the elastomeric mass 108 and thereby may increase the pressure initially imparted to the latter, by the extrusion screw 106 and extrusion barrel 102, in an additive or supplemental manner. The roller 116 and primary die segment guide-surface 120 thus function in a manner similar to that of a calendering apparatus and add significantly to the overall pressure to which the elastomeric mass 108 is subjected as the latter passes through the wedge-shaped pressure chamber 125. The overall or combined pressure developed by the extruder assembly 100 and the die-roller calendering unit 109 may thus allow the elastomeric mass 108 to properly, and under significant pressure, flow uniformly through the narrow restriction orifice 126. The issuing product may thereby be provided with coherent feathered edges of extremely high integrity in which there is substantially, if not entirely, no blemishes, serrations, or other surface imperfections which otherwise, if present, may reduce the stitching quality of the tread slab to a tire carcass (not shown).

This example thus may provide an arcuate nature of the primary die segment guide-surface 120 which a concavity confronting and converging toward the roller 116. The concavity of the surface 120 in conjunction with the convexity of the segment of the roller 116 may define the elongate, low-angle wedge-shaped pressure chamber 125 through which the elastomeric mass 108 passes under pressure. The elastomeric mass 108 moves into progressively increasing pressurized contact with the contoured surface of the primary die segment guide-surface 120 as it proceeds through the chamber 125. The contoured surface herein refers to the axial extent of the chamber 125, which may initiate at the rear face or surface-discontinuity 190 (FIG. 2) of the die-blade 122 and terminate at the restriction orifice 126. Because of the concave nature of the surface 120 (as viewed in FIG. 2), circumferentially of the roller 116, this surface may be more proximate to the roller 116 than would be the convex surface of an opposing roller mate for the roller 116 (had roller 116 been provided as part of a two-roll calendering assembly in which the mate is of similar outer diameter). The chamber 125 may, therefore, be characterized as an elongate convergent zone, through which the elastomeric mass 108 passes, having an effective working surface extent which is substantially greater than that of the nip between opposing similar outer diameter rollers of a two-roll calendering assembly.

Alternatively, the surface 120 may be non-curvilinear, or of straight line character, having a substantially infinite radius of curvature, so that the portion of the surface 120 at the orifice 126 of the die-blade 122 is still more proximate to the roller 116 than the remaining portions thereof, and so that there still remains an elongate, wedge-shaped pressure chamber or zone having an effective working surface extent greater than that of an opposing-roller assembly.

In either instance, the elastomeric mass 108 is treated (shaped) for a longer period of time and over a longer effective working zone than opposing-roller calendering assemblies may provide, and, thus, coherent and blemish-free feathered edges are more reliably and effectively formed. Accordingly, this method, utilizing principally the assembly FIGS. 1-3, relates to shaping or otherwise forming an elastomeric strip, such as that of the strip 160, by feeding or extruding an elastomeric mass under pressure between mutually confronting stationary and movable surfaces which cooperatively define an elongate pressure chamber. The stationary surface in this instance refers to that of the primary 118 and secondary die segment guide-surfaces 120. The movable surface refers to the rotatable roller 116, and the elongate pressure chamber refers to the wedging pressure chamber 125. Thereafter, the cross-sectional thickness of the elastomeric mass 108 is significantly reduced, thinned, and/or otherwise narrowed under increased pressure as it passes through a narrow restriction orifice 126 at the end of the wedge-shaped pressure chamber 125.

The method generally employs the driving of the roller 116 to supplement or add to the initial pressure to which the elastomeric mass 108 is subjected by the extrusion screw 104 and the extrusion barrel 102, the roller 116 being driven at a rate significantly greater than the rate at which the elastomeric mass 108 is extruded thereupon, this to frictionally carry and thereby wedge an increased quantity of the elastomeric mass 108 into and through the wedge-shaped pressure chamber 125, to increase the energy introduced into the elastomeric mass 108, and thereby increase the pressure to which the elastomeric mass 108 is subjected.

Despite the usefulness of the above conventional design, production of extrudates/components with desired dimensional characteristics remains a challenge in the tire industry. Variations in compound properties, as well as material variability (e.g., viscosity, elasticity, etc.) produce varied extrudate cross sections. The extruder/roller die combination provides an advantage in that the width of the extrudate cannot be varied as much as the gauge/thickness of the extrudate as a function of roll speed and/or extruder speed. The gauge of the component may be varied by moving the die in a pivotal motion relative to the roll. A rounded bottom on the die may ensure a seal between the roll and the die, thus making the extrudate trim-less. The profile cut into the die may pivotally adjust die profiles of different gauges as the projected cross section changes with die rotation.

The present invention thereby provides an easily adjustable die 200. Using the advantages of the roller/die/extruder, the pivotable die 200 may adjust the extrudate profile as the compound and extrusion conditions change. Conventionally, adjustments of contour of the roller die extrudate are conducted by roll speed, extruder speed, and/or takeaway belt speed. These adjustments may stretch (or relax) the component and disadvantageously alter shrinkage and snapback properties, the results of which may be evidenced in the tire building room. The adjustable die 200 thereby facilitates cross sectional change without change in shrinkage and also may provide the opportunity for faster die design and development resulting from variations in compound properties, as well as material variability.

As stated above, by pivoting the die 200 relative to the roller 116, the projected cross-sectional area of the die decreases and the extrudate may have a smaller/larger gauge. The die 200 may be cut round on the bottom to provide a pivotable sealing surface against the roller. The die 200 may be pivoted in the simplest case by inserting angled spacers behind the die that simultaneously rotate the die in relation to the extrudate flow and keep the die in contact with the roller 116. The die 200 may then be clamped in place (not shown). Conventional shims or spacers added to achieve die rotation is a manual process and not conducive to quick changes in extrudate profile. Further, a series of rubber/metal plates bonded together may be rotated in the desired direction while maintaining the integrity in the extrusion direction.

The previous descriptive language is of the best presently contemplated mode or modes of carrying out the present invention. This description is made for the purpose of illustrating an example of general principles of the present invention and should not be interpreted as limiting the present invention. The scope of the invention is best determined by reference to the appended claims. The reference numerals as depicted in the schematic drawings are the same as those referred to in the specification. For purposes of this application, the various examples illustrated in the figures each use a same reference numeral for similar components. The examples structures may employ similar components with variations in location or quantity thereby giving rise to alternative constructions in accordance with the present invention.

What is claimed is:

1. An apparatus for forming an elastomeric strip, the apparatus comprising:
    a roller having a cylindrical surface, the roller rotating at a predetermined angular velocity;
    a stationary, contoured arcuate guide-surface which tapers toward the roller and confronts the roller coextensively, the arcuate guide surface forming part of a vertically adjustable die-blade, the die-blade being vertically adjustable by pivoting of the die-blade about a horizontal axis to permit adjustment of the clearance between an upper surface of the roller and the arcuate guide surface;
    an adjustable surface confronting the upper surface of the cylindrical surface and having a first stationary position relative to the upper surface of the cylindrical surface such that the apparatus forms an elastomeric strip having a first thickness, the adjustable surface being adjustably pivotable relative to the upper surface of the cylindrical surface such that the adjustable surface moves to a second stationary position for forming an elastomeric strip having a second thickness, the adjustable surface having a hemispherical surface opposing the roller;
    angled spacers inserted behind the adjustable surface for simultaneously rotating the guide surface in relation to the elastomeric strip and keeping the guide surface in contact with the roller; and
    a pair of stationary, low-friction, bearing members for directly engaging the roller and permitting generally unrestrained rotation of the roller.

2. The apparatus as set forth in claim 1 wherein the adjustable surface moves to a third stationary position for forming an elastomeric strip having a third thickness.

3. The apparatus as set forth in claim 1 further including an extruder assembly for conveying an elastomeric mass to the roller and the adjustable surface.

4. The apparatus as set forth in claim 3 wherein the extruder assembly includes an extrusion barrel and an extrusion screw rotating within the extrusion barrel for conveying the elastomeric mass with the extrusion barrel.

5. The apparatus as set forth in claim 1 further including a transition pressure chamber for receiving the elastomeric mass from the extruder assembly.

6. The apparatus as set forth in claim 5 wherein the transition pressure chamber widens horizontally and narrows vertically in a direction of flow of the elastomeric mass.

7. The apparatus as set forth in claim 6 wherein the transition pressure chamber has an elongate trunk portion downstream of the widening and narrowing transition pressure chamber.

8. The apparatus as set forth in claim 1 wherein the elastomeric strip is a tread slab.

* * * * *